(12) United States Patent
Chokshi et al.

(10) Patent No.: US 7,725,555 B2
(45) Date of Patent: May 25, 2010

(54) DETECTING MISSING ELEMENTS IN A STORAGE AREA NETWORK WITH MULTIPLE SOURCES OF INFORMATION

(75) Inventors: Ashmi A. Chokshi, Santa Clara, CA (US); Glen Hattrup, Overland Park, KS (US); David L. Merbach, Rochester, MN (US); Prasenjit Sarkar, San Jose, CA (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/470,580

(22) Filed: Sep. 6, 2006

(65) Prior Publication Data

US 2008/0059599 A1 Mar. 6, 2008

(51) Int. Cl.
*G06F 15/167* (2006.01)
(52) U.S. Cl. ............... 709/212; 709/220; 709/221; 709/223; 709/224; 709/242
(58) Field of Classification Search ........ 709/212, 709/220, 221, 223, 224, 242; 714/1, 8, 25, 714/42
See application file for complete search history.

(56) References Cited

U.S. PATENT DOCUMENTS

| | | | |
|---|---|---|---|
| 6,845,387 B1 | 1/2005 | Prestas et al. | |
| 6,854,035 B2 | 2/2005 | Dunham et al. | |
| 6,931,441 B1 * | 8/2005 | Roden et al. | 709/223 |
| 7,203,730 B1 * | 4/2007 | Meyer et al. | 709/213 |
| 2003/0149769 A1 * | 8/2003 | Axberg et al. | 709/225 |
| 2003/0149919 A1 * | 8/2003 | Greenwald et al. | 714/43 |
| 2003/0154267 A1 * | 8/2003 | Camacho et al. | 709/223 |
| 2003/0179227 A1 | 9/2003 | Ahmad et al. | |
| 2003/0182422 A1 | 9/2003 | Bradshaw et al. | |
| 2003/0189929 A1 | 10/2003 | Matsuzaki et al. | |
| 2004/0006612 A1 | 1/2004 | Jibbe et al. | |
| 2004/0034746 A1 | 2/2004 | Horn et al. | |
| 2004/0039756 A1 | 2/2004 | Bromley | |
| 2004/0088294 A1 | 5/2004 | Lerhaupt | |
| 2004/0088366 A1 | 5/2004 | McDougall et al. | |
| 2004/0153844 A1 | 8/2004 | Ghose et al. | |
| 2005/0226059 A1 | 10/2005 | Kavuri et al. | |

* cited by examiner

*Primary Examiner*—Larry Donaghue
*Assistant Examiner*—Nicholas Taylor
(74) *Attorney, Agent, or Firm*—Canady & Lortz LLP; Bradley K. Lortz (57) ABSTRACT

A detectibility service for a storage infrastructure manager (SIM) operating on a storage area network (SAN) is disclosed directed to addressing a situation where there may be multiple sources of duplicate or contradictory information to the SIM about the presence and condition of an element in the SAN. The service can account for both authoritative as well as nonauthoritative sources of information in a SAN, which participate in the discovery process scanning for SAN elements. Both authoritative and nonauthoritative sources of information can be used to report a given SAN element during a probe, taking advantage of the more efficient processing of information from authoritative sources to override information from nonauthoritative sources regardless of the order in which the various scans may occur.

20 Claims, 6 Drawing Sheets

DETECTING MISSING ELEMENTS IN A STORAGE AREA NETWORK WITH MULTIPLE SOURCES OF INFORMATION

BACKGROUND OF THE INVENTION

1. Field of the Invention

This invention relates to networked storage devices in a computer system. Particularly, this invention relates to managing such storage devices in a storage area network (SAN).

2. Description of the Related Art

A typical storage area network (SAN) comprises multiple entities such as hosts, storage subsystems, host bus adapters, storage volumes, and ports. In addition, a connection between two devices is a relationship that may be tracked. One example where such tracking is valuable is demonstrated in the case where three objects exist in a SAN and two of those objects can see the third, but they cannot see each other; tracking relationships reveals this, whereas tracking only entities would not. The state of these various entities and relationships may often be in flux. At any moment, entities get created, deleted, and become unreachable. In addition, the attributes of the entities may change, e.g. in response to events occurring in the SAN.

Storage infrastructure management software may be used to manage such complex SANs comprising equipment from multiple vendors. One important aspect of such management software is the process of running discovery tasks, or probes, to discover the entities in the SAN and the relationships (associations) between those entities. (The various entities and relationships within a SAN may be collectively referenced as "elements" hereafter.) Another key aspect of such management software is the use of a configuration database to store information about the discovered entities and relationships.

One feature such a storage infrastructure manager (SIM) must provide is health and fault management. One aspect of such health and fault management is to alert the administrator (e.g. via standardized events such as SNMP traps, messages to a pager, or highlighting of the element in the SIM GUI) when elements in the SAN appear to be "missing". An element may be declared to be missing under a variety of scenarios. For example, an element is missing if it is not visible to the SIM through any of its SAN probing mechanisms. An element is also considered missing if the SIM is informed (via mechanisms, such as SNMP alerts or CIM indications, that it has in place to listen for events from SAN elements), that an entity (e.g., a storage volume) or relationship (e.g., a link between two ports) has been removed. An element is also missing if it is actually removed via the control interface or application programming interface (API) of the SIM itself.

Once a baseline discovery process of all elements in a SAN has been completed and the configuration database has been populated, it is relatively easy to process the missing element scenarios which either involve the SIM being informed about the event, or the removal occurring via use of the SIM's control interfaces. For example, when an event is received indicating that some element is no longer present in the SAN (e.g., a CIM indication informs the SIM that a storage volume has been deleted), or when the deletion occurs through the SIM's user interface or API itself, the configuration database can be updated in response, and an event can be generated to alert the administrator at the same time.

However, the scenario where an element simply becomes invisible to the SIM is more complex because there can be multiple sources of information that assist the SIM's discovery process and some types of information sources can provide duplicate or contradictory information about whether an element is visible to the SIM or not. Such informational inconsistencies must be reconciled by the SIM software before a conclusion about the visibility of the element can be reached. This problem is particularly significant because the disappearing device may not send a notice that it is going to disappear. This problem may be referred to as the "detectability problem."

Ideally, a SIM, once installed, would perform a full discovery of all elements on the SAN, populate its configuration database, and from then on, keep the database up-to-date regarding SAN elements that are no longer visible to it via the SIM either being informed directly, or via the removal of the elements through the SIM API. However, there are two practical issues that cause less than ideal conditions. Firstly, not all operations to manipulate the SAN elements (e.g., to delete a storage volume) are performed through the SIM interface because other means, such as individual element managers (i.e. management software specialized for a specific storage subsystem) can be used instead, bypassing the SIM. Secondly, some kinds of physical (re)configuration cannot be performed by management software, such as removing the cable between a host's fibre channel port and that of a switch. If all systems on a SAN diligently generated events for all configuration changes that occur (e.g., including physically connecting two ports together or removing such a link), then ideally, the SIM software could listen for such events and update its database to reflect detectability status in real-time. But this is not always the case and leads to the second practical issue: not all systems on a SAN currently generate such events correctly. This is especially true in scenarios where the event subscriber (i.e., the SIM software) is not operational when the event is generated. Support for features such as persistent CIM indications would help in this area, but such implementations are not widely available, and equivalent robust event delivery mechanisms do not typically exist in the SNMP world. In view of this, it is evident that there is a need to address the detectibility problem using additional mechanisms.

A subset of the detectibility problem has been addressed before in some prior art—namely, products such as the Tivoli SAN Manager and the IBM TotalStorage Productivity Center v2.x. However, the sources of information performing discovery of SAN elements on behalf of the SIM were presumed to be nonauthoritative, and thus, the logic for inferring detectability was focused on achieving consensus between distinct sources of information that could provide either duplicate or contradictory information. Other systems and methods have also been developed to manage networked storage devices.

However, there is still a need in the art for systems and methods to detect missing elements in a storage area network with multiple sources of information. Particularly, there is a need in the art for such systems and method to efficiently resolve duplicate or contradictory information from distinct sources. These and other needs are met by the present invention as detailed hereafter.

SUMMARY OF THE INVENTION

Embodiments of the present invention are directed to addressing the "detectability problem", described above. The problem may be addressed through a detectability service. Embodiments of the invention may employ a mechanism to address the detectability problem by accounting for both authoritative as well as nonauthoritative sources of information (defined hereafter) in a SAN, which participate in the discovery process. Embodiments of the invention can provide a process for handling discovery that is more efficient in terms of both space (required in the database) and time (to execute database queries to reach a conclusion about detectability), when there are authoritative sources of information providing input to the discovery process. Further, embodiments of the invention can handle situations where there are both authoritative and nonauthoritative sources of information that report a given SAN element during a probe, taking advantage of the more efficient processing of information from authoritative sources to override information from nonauthoritative sources regardless of the order in which the various scans may occur.

A typical embodiment of the invention comprises a computer program embodied on a computer readable medium including program instructions for gathering information about one or more storage area network (SAN) components using a discovery process involving scanning one or more data sources for a storage infrastructure manager (SIM), program instructions for storing the information in a database, and program instructions for analyzing the information from the discovery process to infer which of the one or more SAN components are currently detectable to the SIM, where each of the one or more sources of the information are classified as either only an authoritative source or only a nonauthoritative source and the information from any authoritative source is prioritized over the information from any nonauthoritative source. Analyzing the information from the discovery process may be performed by a detectability service of the SIM.

In further embodiments, processing of detectability information from any nonauthoritative source includes consensus determination such that a SAN component is only identified as missing when each of the one or more nonauthoritative sources of the information reports the SAN component as missing during the most recent scan. The information reported by authoritative sources is prioritized over that reported by nonauthoritative sources in that if an authoritative source reports a SAN element as missing, the element is marked as such even if one or more nonauthoritative sources have reported it as being visible in the most recent scan.

Typically, one or more management agents may be used to manage the one or more SAN components which communicate the information about those SAN components to the SIM. In addition, the information about the one or more SAN components may be dynamically determined and persisted in the database, e.g. in one or more tables in a relational database. The SIM may use one or more database mappers for updating the database with the information from the one or more SAN components, the job of the mappers being to isolate the information reported by the discovery process (see below) from the schema of the underlying database where the discovery results are stored.

Further embodiments of the invention may include a discovery engine operating within the SIM. The discovery engine includes one or more scanners for probing one or more storage area network (SAN) components during the discovery process and receiving the information, one or more parsers for parsing the information received from the one or more scanners, and one or more processors for communicating the parsed information through one or more database mappers to store the parsed information in a database. The information that is reported by each of the one or more scanners may be either authoritative or nonauthoritative but not both. Each of the one or more scanners is either an in-band scanner or an out-of-band scanner.

Similarly, a typical method embodiment of the invention comprises the steps of gathering information about one or more SAN components using a discovery process by probing one or more data sources, storing the information in a database, and analyzing the information from the discovery process to infer which of the one or more SAN components are currently detectable to the SIM, where each of the one or more sources of the information are each classified as either only an authoritative source or only a nonauthoritative source and the information from any authoritative source is prioritized over the information from any nonauthoritative source. The method embodiment of the invention may be further modified consistent with the computer program or system embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

The present invention is directed to systems and methods for detecting missing elements in a storage area network with multiple sources of information. Embodiments of the invention can provide a mechanism to address the detectability problem by accounting for both authoritative as well as non-authoritative sources of information in a SAN (which participate in the discovery process), providing a process for handling discovery that is thereby more efficient in terms of both space and time (when there are authoritative sources of information providing input to the discovery process), handling the case where there can be both authoritative and non-authoritative sources of information (that report a given SAN element during a probe), and taking advantage of the more efficient processing of information from authoritative sources to override information form non-authoritative sources regardless of the order in which the various scans may occur. Embodiments of the invention may also perform a process of providing the key components involved in determining detectability, using characterizations of scanners used to probe systems, defining a missing element, processing of scanner results to identify missing elements, providing inter-component flows for determining detectability of elements, providing database changes for detectability, and providing logic to determine detectability.

An important innovation of the invention is distinguishing between nonauthoritative and authoritative sources of information regarding SAN elements and applying that distinction to detection processing. Nonauthoritative sources can define something as missing only if all of them report it as missing in their most recent scan; this is a consensus requirement for nonauthoritative sources. On the other hand, any authoritative source can report an element as missing, and the SIM will accept that as the truth, even if one or more nonauthoritative sources have reported that element as being visible during their last scan. It is this ability to prioritize the information reported by authoritative sources over nonauthoritative sources, so that we do not have to wait for all nonauthoritative sources to report that an element is missing whenever they report the information in the future, which leads to the enhanced efficiency of embodiments of the invention.

Figure 1:
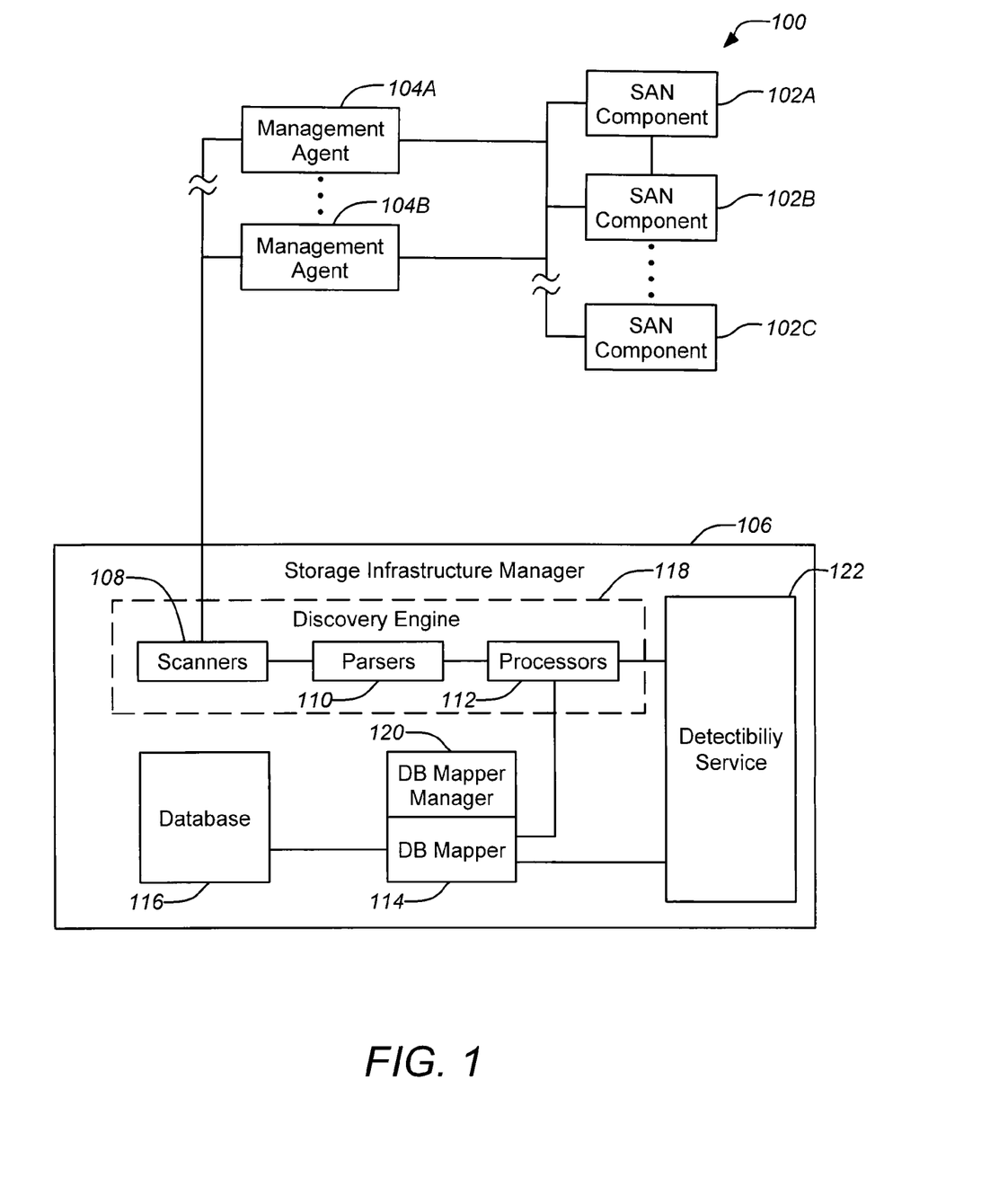
FIG. 1 is a functional block diagram of an exemplary embodiment of the present invention for detecting missing elements in a storage area network with multiple sources of information.

FIG. 1 is a functional block diagram of an exemplary embodiment of the present invention. At a high level, certain components may be present in a management domain of a storage area network (SAN) 100 implementing an embodiment of the invention. There must be one or more SAN components 102A-102C, which are each a system such as a storage subsystem, a switch (e.g fibre channel), or a host (e.g. a server), which is managed by the storage infrastructure manager (SIM) 106. Typically, there should be one or more management agents 104A-104B that are used to manage individual SAN components 102A-102C on the SAN 100. One example of a management agent is a CIM Object Manager (CIMOM) that manages one or more storage subsystems or switches, and which can either reside inside the system or operate outside the system as a proxy, communicating with the system it manages using proprietary APIs. Other examples of management agents are an SNMP agent that resides within a system, or management software that can respond to in-band fibre channel or SCSI commands. Of course, the SIM 106 itself must also be present, several components of which interact with management agents to gather information about systems during discovery, store the information in a database, and perform analysis of the results of discovery to infer what systems or components thereof are currently detectable to the SIM.

Further, there are some key components of the SIM 106 that participate in the process. For example, scanners 108 which are used to probe (or scan) various SAN components 102A-102C by communicating with management agents 104A-104B for those SAN components 102A-102C. A scanner 108 reports a SAN component's internal components, relationships between those components, and optionally, the relationship of the SAN component and its subcomponents to other entities on the SAN. Scanners 108 can be characterized by how they are implemented, either "in-band" or "out-of-band", and also by the nature of the information they report from the probe of a system, namely whether the information is authoritative or nonauthoritative. This is described in more detail hereafter. Note that a scanner 108 may represent software that is part of the SIM 106 itself, or (for in-band scanners) software that executes on a separate host (server), and communicates the results of the scan to the SIM 106 over the network. In addition, parsers 110 parse the results of probes returned by scanners 108. Throughout this description, it may be assumed that the result of a probe can be represented as an XML stream, whose structure could conform to a standard format (e.g., CIM-XML), or a proprietary format when no standards exist. An example of the latter is the probe result that may be returned by an in-band fabric scanner that probes a SAN by communicating with a fibre channel switch using the Fibre Channel Generic Services (3) protocol (FC-GS-3). Next, processors 112 interact with parsers 110, and communicate with database mappers 114 to store probe results in a database 116. Scanners 108, parsers 110, and processors 112 are subcomponents of the discovery engine 118 component of the SIM 106. Database mappers 114 and a mapper manager 120 can provide an isolation layer between the discovery engine 118 and the structure of the database 116 (i.e. the database tables) used to store the information resulting from a probe, namely the entities and associations reported by a scanner. Finally, a detectability service 122 is a component of the SIM 106 that can interact with the processors 112 as well as the various database mappers 114 to implement the detectability logic. The SIM 106 may be implemented as software operating across a distributed computing system, an example of which is described in the next section.

2. Hardware Environment

Figure 2A:
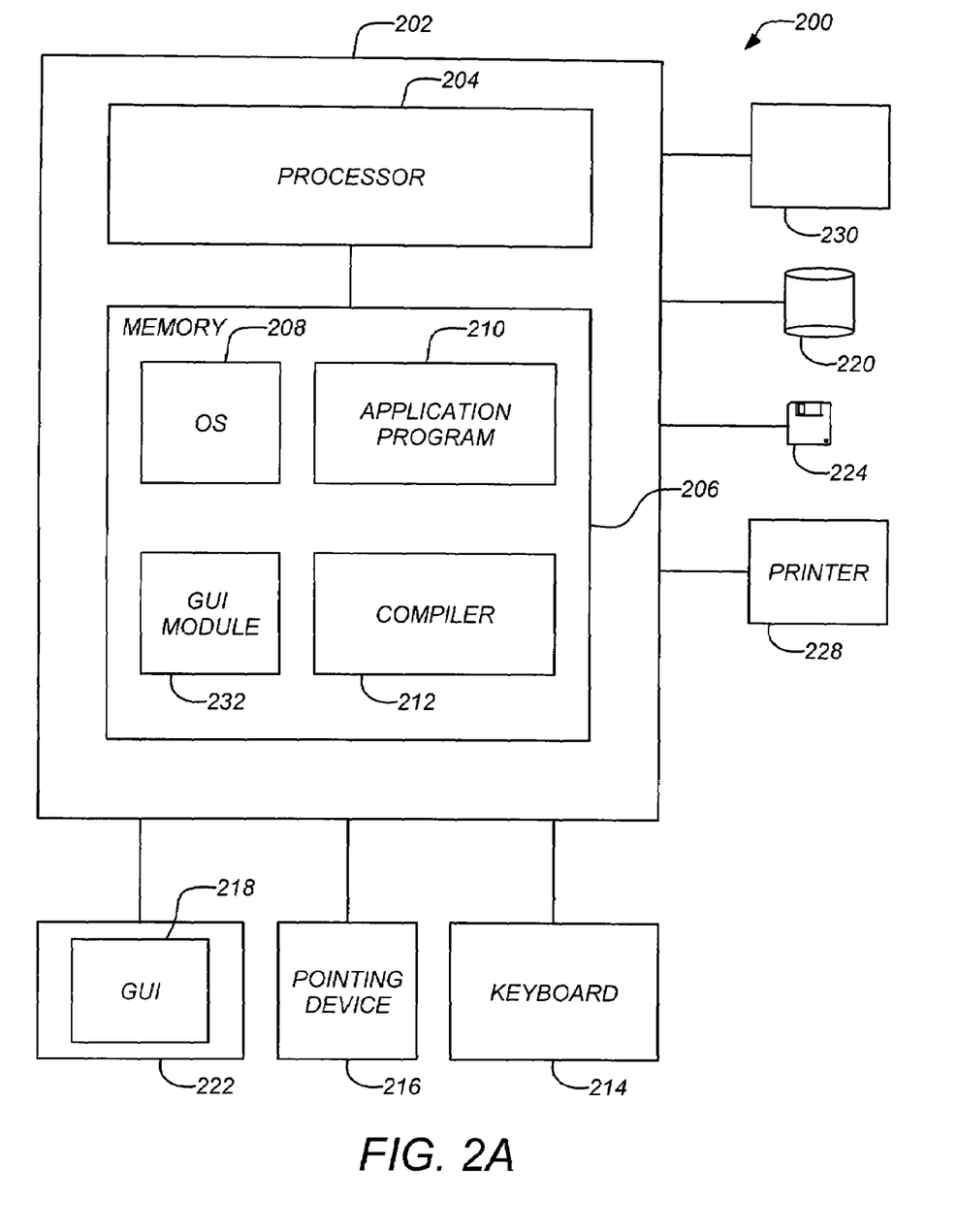
FIG. 2A illustrates an exemplary distributed computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that includes functions for managing a distributed computer system comprising a network of computing devices, particularly in a SAN. The program 210 may operate within a single computer 202 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art. (Note that a fibre channel SAN is typically used only for computers to communicate with storage systems, and not with each other.)

Figure 2B:
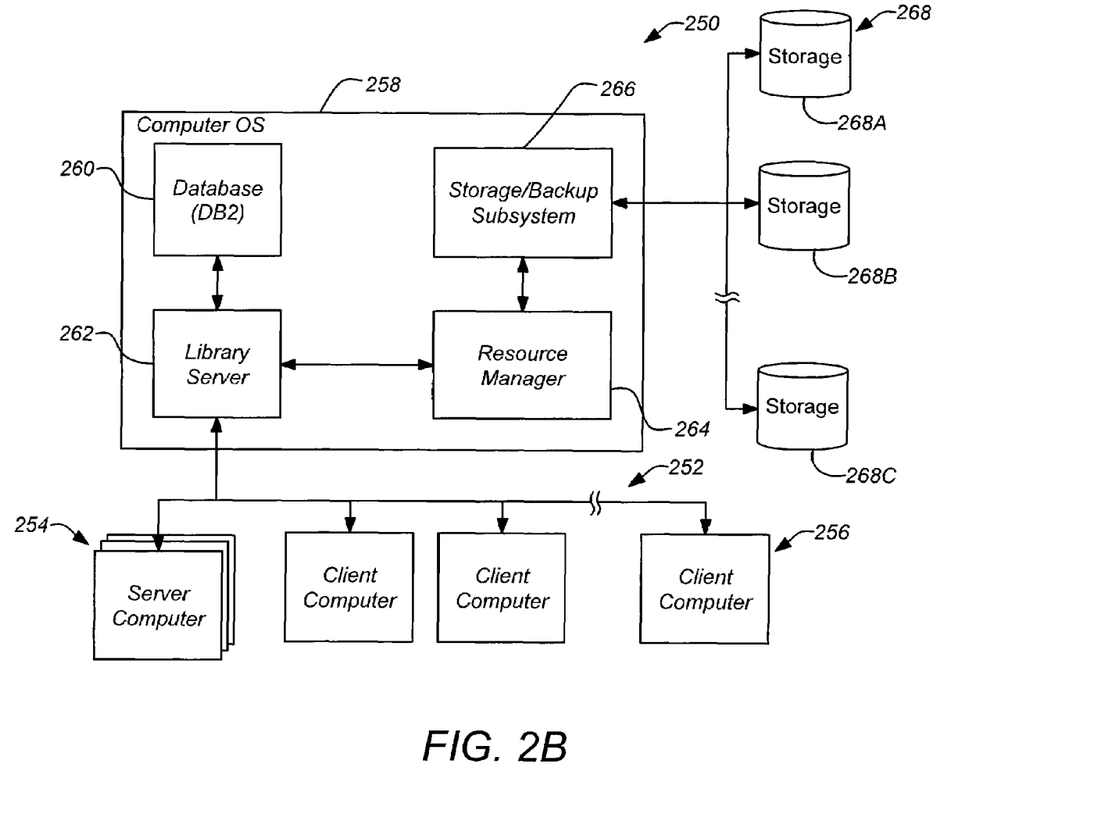
FIG. 2B illustrates an exemplary storage area network of computing devices that can be used with embodiments of the present invention.

FIG. 2B illustrates a typical distributed computer system 250 which may be employed in an typical embodiment of the invention. Such a system 250 comprises a plurality of computers systems 200 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers systems 200 may be specially designed to function as a server or host 254 facilitating a variety of services provided to the remaining client computers 256. In one example one or more hosts may be a mainframe computer 258 where significant processing for the client computers 256 may be performed. The mainframe computer 258 may comprise a database 260 which is coupled to a library server 262 which implements a number of database procedures for other networked computers systems 200 (servers 254 and/or clients 256). The library server 262 is also coupled to a resource manager 264 which directs data accesses through storage/backup subsystem 266 that facilitates accesses to networked storage devices 268A-268C. The networked storage devices 268A-268C comprise a SAN including devices such as disk-based storage systems, optical storage and/or tape storage indicated as distinct physical storage devices 268A-268C. Various known access methods (e.g. VSAM, BSAM, QSAM) may function as part of the storage/backup subsystem 266.

Embodiments of the invention may operate within the described hardware environment to manage detecting the presence and status of the SAN components, such as the networked storage devices 268A-268C and their relationships to each other and other hardware. In a typical embodiment, the information regarding the SAN components is then applied by client computers 256, servers 254 and/or the mainframe computer 258 to efficiently utilize the SAN components. Primary software, such as at least portions of the storage infrastructure manager, may function as part of the resource manager 264 within the computer 258.

Those skilled in the art will recognize that many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Scanners to Probe Systems

Referring back to FIG. 1, a scanner 108 may be characterized by how it is implemented. Specifically, a scanner can use in-band techniques which use specific storage (networking) protocols to communicate with a SAN component. Host-based scanners that use fibre channel (e.g. FC-GS-3) commands to query fibre channel switches about elements on the fabric that the switch resides in are one type of in-band scanner. Similarly, host-based scanners that use SCSI commands to query storage subsystems about SCSI logical units (LUs) or volumes that they export are another type of in-band scanner.

Scanners 108 can also use out-of-band techniques to communicate with a system. Generally, all such out-of-band scanners are based on the use of TCP/IP. For example, scanners that use SNMP MIB queries to probe switches on a fibre channel SAN are one type of out-of-band scanner. Scanners that use vendor-specific proprietary APIs to query fibre channel switches about elements on a SAN are another. A CIM client that queries a CIM Object Manager (CIMOM) which manages a system on the SAN, to get information about the subcomponents of that system, is another example of an out-of-band scanner. A typical SIM 106 may employ scanners 108 of one or more of the foregoing in-band and out-of-band types to perform discovery to gather information about the SAN 100.

Another (orthogonal) way to characterize scanners 108 is by the nature of the information they report in a probe or scan. The two such characterizations of a scanner 108 are authoritative and nonauthoritative. A scanner 108 may be considered authoritative if the SIM that processes the probe results can be certain that the element is no longer present if an element the scanner reported in the previous probe is not reported in the latest probe; the information from an authoritative scanner is definitive. A scanner 108 is considered to be nonauthoritative if this is not the case; the information from a nonauthoritative scanner is uncertain. Thus, if a scanner is nonauthoritative, absence of an element in the current probe (which was reported by the same scanner in the previous probe) does not imply that the element is actually missing from the SAN. In the context of the detectability service, the authoritative versus nonauthoritative characterization is critical, because it determines how the detectability service processes the information reported by a scanner.

One example of an authoritative scanner is a CIM client that communicates with a subsystem CIMOM to gather information about the internal subcomponents of the storage subsystem such as the volumes (SCSI LUs), ports, storage pools, physical disk drives, etc. Even if multiple (proxy) CIMOMs can communicate with a given storage subsystem, the CIM client communicates with exactly one of them to probe the subsystem in question, and it would query each CIMOM in exactly the same manner using standardized APIs (based on standardized object models). The assumption here is that all the CIMOMs in the network support the same version of the standard, and if that is not the case, the CIM client would pick the CIMOMs supporting the most recent version. Therefore, when a particular CIMOM no longer reports a subcomponent of a storage subsystem that is internal to that subsystem which was reported earlier (e.g., a storage volume, reported as a SCSI Logical Unit or LU), the SIM that processes the probe result can be certain that the subcomponent is no longer present in the subsystem.

Figure 3:
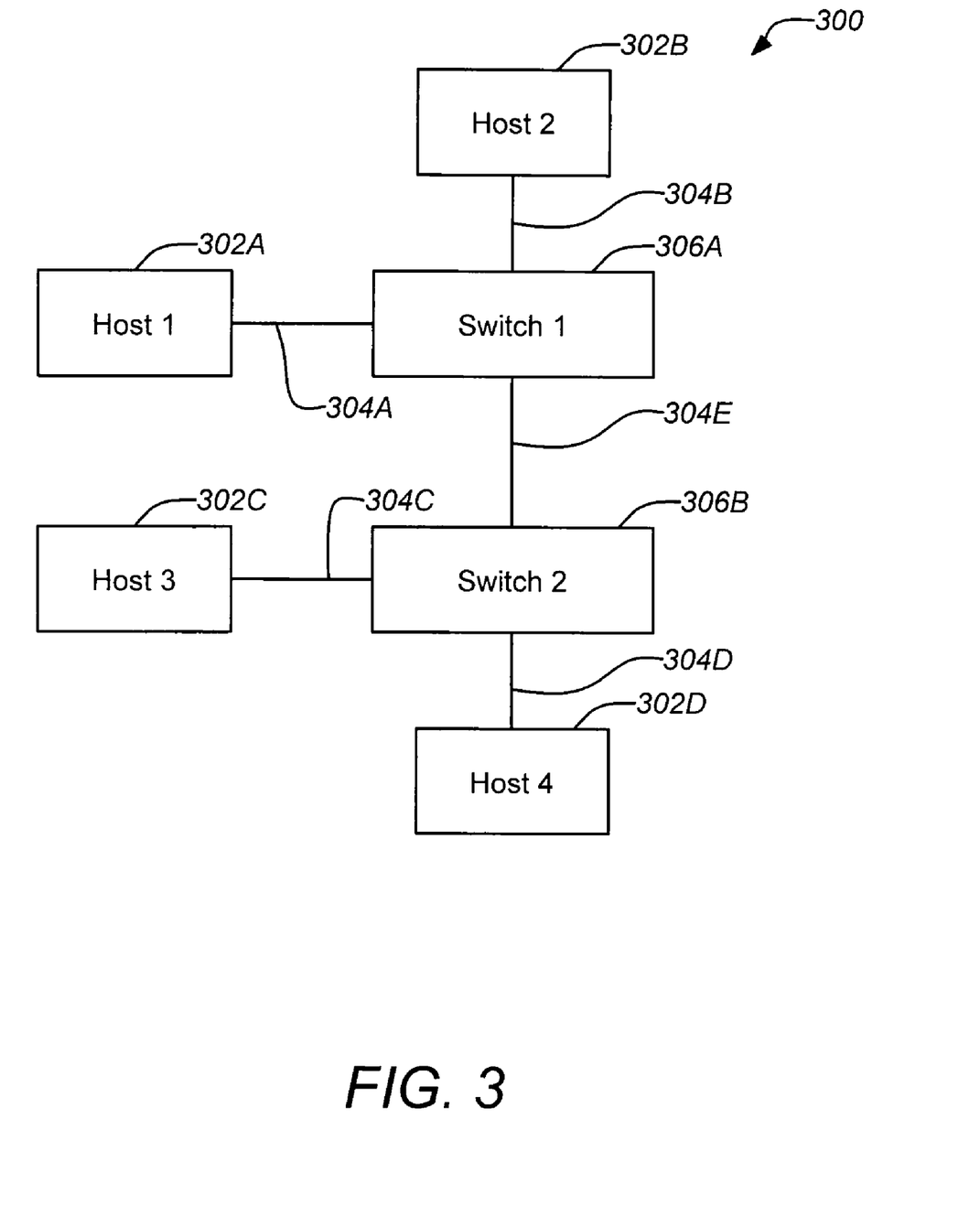
FIG. 3 shows an example of a switch fabric where a scanner probe is nonauthoritative.

FIG. 3 shows an example of a switch fabric 300 or network portion where the inband scanners involved in the probe are nonauthoritative. In this example, there are multiple host-based scanners that discover elements of the switch fabric 300 (e.g. of a fibre channel SAN) using in-band FC-GS-3 commands. The information that such a scanner discovers depends on the connectivity of the host system (where the scanner resides) to the remainder of the fabric 300. The fabric 300 comprises four hosts 302A-302D interconnected via links 304A-304E and two switches 306A and 306B. Hosts 302A and 302B are directly connected to switch 306A (but not to switch 306B) and hosts 302C and 302D are directly connected to switch 306B (but not to switch 306A). The fabric scanner in host 1 302A would normally report all five links 304A-304E in the fabric 300 to the SIM, as well as both switches. However, if the inter-switch link 304E is disabled, the scanner of host 1 302A will only report links 304A and 304B and switch 306A in the next probe, but not links 304C, 304D and 304E, and not switch 306B. However, because the scanner is identified as nonauthoritative, that probe result should not be used to conclude that links 304C, 304D and 304E, and switch 306B, are not present in the SAN any more.

4. Missing Elements

In the context of the above characterizations of scanners, it is also important to define what it means for a SAN component or element to be missing. An element is deemed to be missing if no scanner can detect the element when it probes a system. The element itself might be still present in the SAN. However, if the SIM cannot detect the element, then it will still declare the element to be missing and generate alerts and/or display the element's health status accordingly via its various interfaces (e.g. Graphical User Interface or GUI). For example, a storage subsystem can be present in the SAN and be turned on, and yet still appear to be missing to the SIM if any of the following conditions are true. First, no proxy CIMOM is active, or no active CIMOM is able to communicate with the storage subsystem. Second, no host-based scanners are installed in hosts that have fibre channel attachments to a fabric that the subsystem is also attached to. Third, an error has occurred in the connection to the network. For example, this could be either a SIM connection problem or a device connection problem.

The basic characterization of a scanner as an authoritative or nonauthoritative source of information about an element which it reports in a probe is key to the process of determining whether the element is visible to the SIM. When an element is only reported by authoritative scanners, and one instance of such a scanner does not report an element in a probe that it reported in an earlier probe, then that element can be immediately identified as being missing. An example of such an element is a SCSI LU (storage volume) reported by storage subsystem CIMOMs. Also, if an element is only reported by nonauthoritative scanners, and one instance of such a scanner does not report an element in a probe that it reported in an earlier probe, then a consensus-determining algorithm must be executed to analyze what other nonauthoritative scanners reported in their most recent probes regarding the visibility of that element. The element can be marked missing only if all nonauthoritative scanners have not reported that element in their most recent probes. An example of such an element is a fibre channel zone defined in a fabric. Finally, if an element is reported by both authoritative and nonauthoritative sources, then the probe results of each type of scanner is processed according to the information source as outlined above. However, the authoritative scanner results override the probe results reported earlier by nonauthoritative scanners. The process described hereafter accounts for that possibility. An example of such an element is a storage subsystem's fibre channel ports that attach to a fabric; these are reported by both subsystem CIMOMs as authoritative sources, and by in-band fabric scanners which are nonauthoritative sources.

5. Inter-Component Flows for Determining Detectability of Elements

Figure 4:
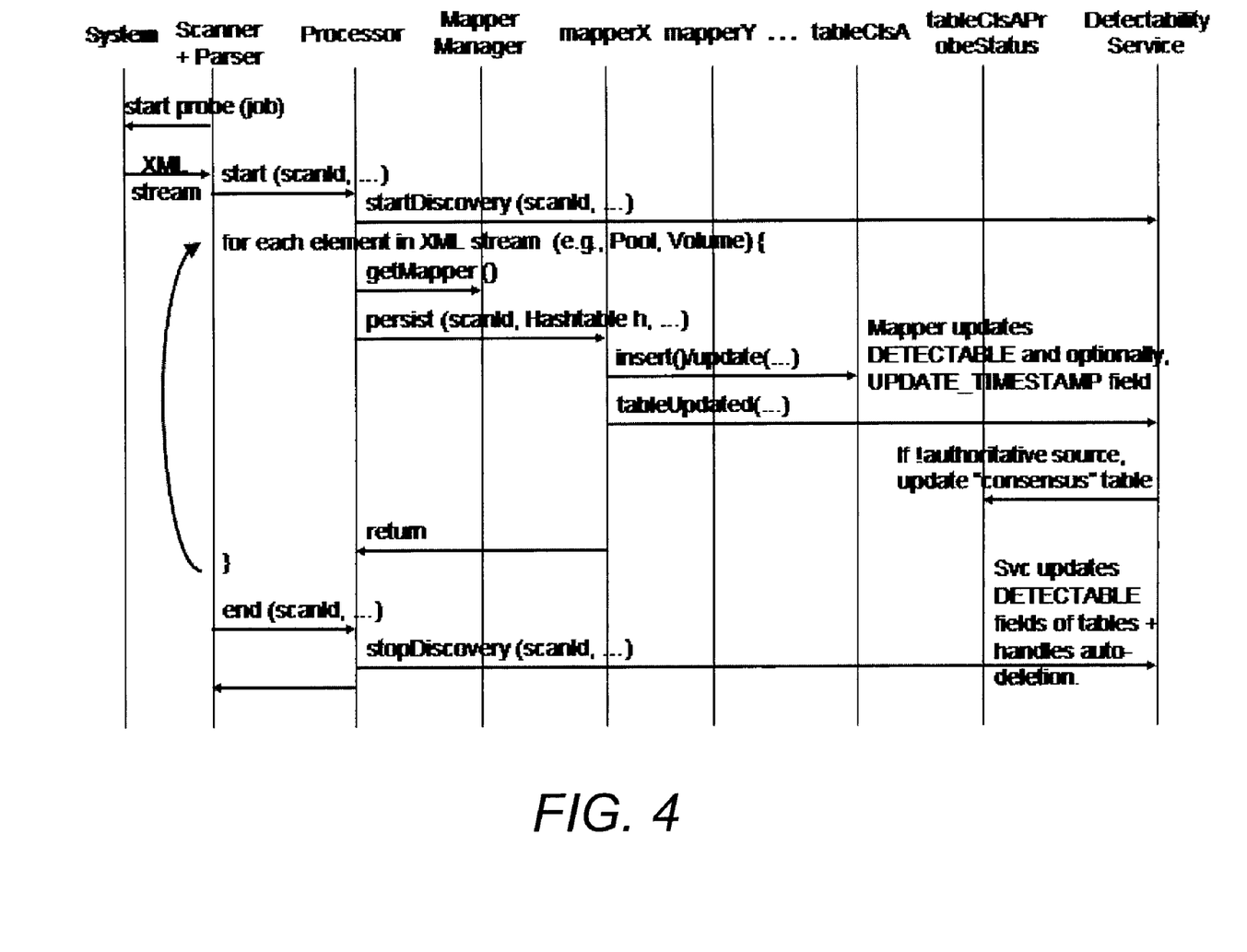
FIG. 4 is a process flow illustrating the interactions between the various components in a typical embodiment of the invention.

FIG. 4 is an exemplary process flow illustrating the interactions between the various components in a typical embodiment of the invention. The interactions, occurring both within the SIM and external to it, are involved in determining whether an element is visible to the SIM or not at any point in time via the discovery process.

After a scanner probes a system and produces the results (e.g. in XML form), a matching parser component parses the output and a processor component handles the population of the configuration database based on the parsed result. For each XML tag that corresponds to an element that must be recorded in the configuration database, the processor calls the mapper manager to access a database mapper instance that can persist information about that element in the database. A database mapper encodes domain knowledge regarding which database tables to update to persist information about an element. It in turn calls methods of classes that hide details of the database schema from the higher layers of the SIM (including the mappers).

The main interactions with the detectability service may occur between the processor component that processes the results of a probe, and the database mappers that update the database. The discovery process informs the detectability service about every probe as well as the types of information discovered during each probe. The detectability service then dynamically processes each such type of information, as well as any types of information discovered during similar previous scans, and analyzes this configuration information for data that refers to stale or disappeared entities. These entities can then be processed in an appropriate way, e.g flagged as missing, removed from the database and hence from any display views, and so on. For example, the processor component may identify the boundary of a probe, by invoking a startDiscovery method of the detectability service to inform it when DB population or update is about to begin following a probe, and later by invoking the stopDiscovery method of the service to indicate when DB population or update has ended, i.e. processing of the result of a probe is complete. In addition, each database mapper which updates a database table can invoke the tableUpdated method of the detectability service to inform it that a database table has been updated during the processing of a probe. A scan ID that encodes information about the type of scanner (e.g., a storage subsystem CIMOM, or an in-band fabric scanner), and also uniquely identifies the scanner instance, may be passed in all of the above method calls to correlate the processing that is associated with a given probe.

6. Database Changes for Detectability

In the configuration database of the SIM which is used to store information about elements on the SAN, several data model enhancements may be introduced in support of an embodiment of the detectability service.

First, a means for representing a missing element should be provided. This can be accomplished using an integer-valued field, boolean, or any other suitable variable type. In one example, an integer-valued field, e.g. labeled DETECTABLE, may be introduced in each table representing an element (an entity or a relationship between multiple entities), whose detectable status is to be determined and represented after a probe of a system. A value of 0 indicates that the element is not visible to the SIM, and 1 indicates that it is. This field can be used for two purposes. First, if the DETECTABLE field is set to 0, then the GUI can display the element's missing status appropriately. Second, even if the GUI is not interested in displaying the missing status, the presence of a DETECTABLE field plus its value being set to 0 can be used to delete database records (tuples) that correspond to elements that are no longer visible, in a lazy fashion. Note that if an element's missing status is not of interest for generating alerts or displaying visually to the administrator, then the corresponding database tuple can be deleted as soon as the detectability service logic identifies it as missing.

Next, a metadata table may be used to track elements reported by a type of scanner. It should be noted that the data may be stored in any format. In general, a given type of scanner (e.g., a CIM client requesting a storage subsystem CIMOM to perform a full scan of a storage subsystem) will report various types of elements. If a subsequent run of the same scanner does not report an element of a certain type, then that information can be used to infer the fact that all instances of that element that were previously reported by that scanner are no longer visible to that scanner. It is possible to statically represent (e.g. in SIM code) all element types (and the corresponding database tables used to represent them) that can be reported by a given type of scanner. However, it is more flexible to use a method that dynamically determines the types of information that were processed during a given scan or probe by tracking the historical data about similar previous scans, since that does not require (error prone) static configuration definitions. For example, one embodiment may introduce a detectability service to dynamically determine that information, and to persist it across multiple activations of the SIM, by learning that information during multiple runs of a given type of scanner and persisting it in a metadata table. That table, e.g. SCANTYPE2TABLE, may include fields identifying the type of scan (e.g. field name, SCAN_TYPE) as well as the corresponding table name representing the element, and (e.g. field name, TABLE_NAME), for example.

In addition, embodiments of the invention may use metadata to track detectability of elements reported by at least one authoritative scanner. It is important for the detectability service to determine what data is stale. Timestamp-based processing may be used to accomplish this. For example, if an element is reported by at least one authoritative scanner, then a database column, e.g. called UPDATE_TIMESTAMP, may be introduced in the corresponding database table that contains information about that element. This field type is a timestamp, set by the database mapper whenever it inserts or updates a tuple corresponding to the element it represents. The field is used by the detectability service to infer visibility of the element during the processing of the "stopDiscovery" method described hereafter.

Metadata may also be used to track detectability of elements reported by at least one nonauthoritative scanner with embodiments of the invention. Historical discovery information needs to be retained for every entity that is reported by a non-authoritative source. In addition, every time a non-authoritative source discovers an entity, a consensus algorithm consults the discovery history of this entity to analyze whether it is still detectable or not. For example, for each element that is reported by at least one nonauthoritative scanner, one may introduce a database table, e.g called ELEMENT_PROBE_STATUS, to represent information about the visibility of various database elements to each scanner that reports it in a probe. This table may be used to perform a consensus-based determination of detectability of elements for nonauthoritative sources of information. The following fields may be used in the table in an exemplary embodiment. ELEMENT_ID uniquely identifies a tuple representing an element in a database table. ELEMENT_TYPE identifies the database table where the above tuple resides. SCANNER_ID identifies the scanner instance that reported the element in a probe. UPDATE_TIMESTAMP identifies the time when the above scanner last reported that element in a probe. A FOUND field indicates that the element was not found in the most recent probe performed by this scanner if it is set to 0. If FOUND is set to 1, it indicates the reverse.

7. Logic to Determine Detectability

Figure 5:
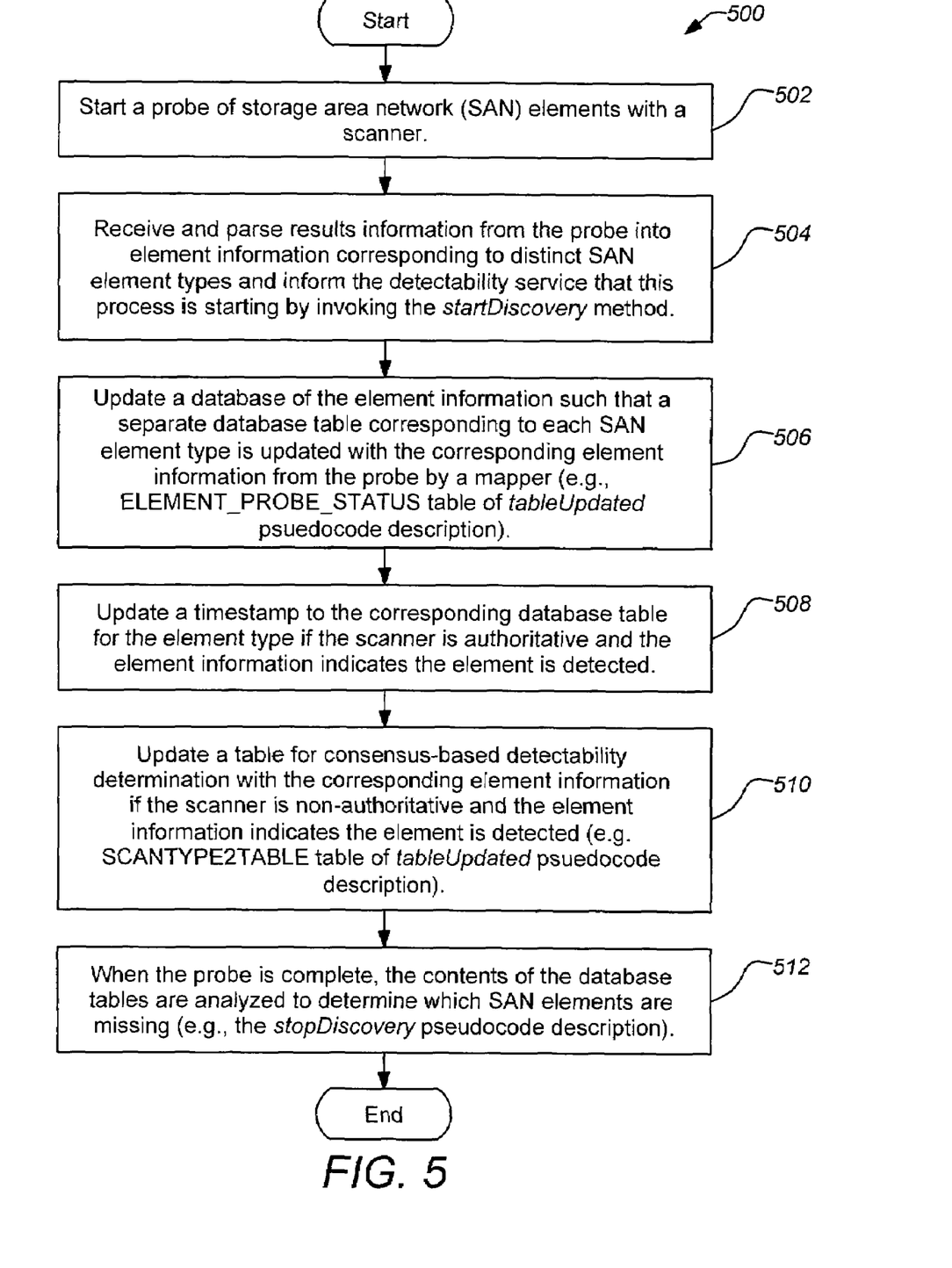
FIG. 5 is a flowchart of exemplary method of determining detectability of SAN elements in an exemplary embodiment of the invention.

FIG. 5 is a flowchart of a method 500 of determining detectability of SAN elements in an exemplary embodiment of the invention. The method 500 begins by starting a probe of SAN elements with a scanner in operation 502. Next, in operation 504, results information from the probe are received and parsed into element information corresponding to distinct SAN element types. The Detectability Service is informed about the start of this process via its startDiscovery method being called. Then in operation 506, a database of the element information is updated such that a separate database table corresponding to each SAN element type is updated (or created if it does not exist) with the corresponding element information from the probe by a mapper. See tableUpdated method psuedocode where the ELEMENT_PROBE_STATUS table is implemented hereafter, as an example logic implementing this.

Next, in operation 508, if the scanner is authoritative and the element information indicates that the element is detected, then the corresponding tuple in database table for the corresponding element type is updated (or created if it does not exist) with a timestamp (indicating when the element was last confirmed as visible). In operation 510, if the scanner is non-authoritative and the element information indicates the element is detected, then the tuple in the table for consensus-based detectability determination that represents the element being detected by that scanner is updated (or the tuple is created if it does not exist). The consensus-based detectability determination table includes a tuple for each non-authoritative scanner reporting status of the particular element. A consensus-determining algorithm can analyze this table to render a status determination for the element as previously described. In addition, the SAN element types that can be reported by each scanner type can be tracked in another table that may be dynamically updated. For example, operation 510 may be performed using the SCANTYPE2TABLE table and associated logic in the tableUpdated method, described hereafter. In operation 512, when the probe is complete, the contents of the database tables are analyzed to determine which SAN elements are missing. See pseudocode for stopDiscovery, describing an example of programming logic for performing this.

The method 500 may be implemented per pseudocode employed for startDiscovery, stopDiscovery, and tableUpdated programmed methods which are described hereafter. The core of the Detectability Service may be implemented in these methods. Some additional logic may also be required in each database mapper that updates a table representing an element whose detectability status has to be maintained.

For example, the following additional processing needs to take place during updates made to a database table by a database mapper, either to insert a tuple when a new element is reported in a probe, or to update the tuple if an element already in the database is reported again. If the table has a DETECTABLE field, it should be set to 1. If the table has an UPDATE_TIMESTAMP field, it should be set to the current time of the database server. These fields should be set even if the values of other fields of the tuple remain the same as reported in the latest probe.

In addition, when the startDiscovery method is called, the detectability service should start tracking the fact that database updates corresponding to the probe results returned by a new scan, as represented by the scan ID passed to the method, have begun. The timestamp of the start of the DB update may be recorded internally, based on the current time on the database server.

The following example pseudocode describes the logic performed by the tableUpdated method, when it is invoked by a database mapper after updating a database table.

```
int tableUpdated(String scanId, String tableName, Hashtable h)
{
    if corr. element has at least one nonauthoritative source {
        insert or update tuple in ELEMENT_PROBE_STATUS table for
        this element with scanid, foreign key ref to the element, a type
        value to identify which table it is referencing, the DB
        timestamp, and set FOUND = 1
        /* This is done even if this scanner is an authoritative
           source for this table's contents */
    }
    Add table to the list of DB tables associated with this scan
    type, for use in the stopDiscovery method, by updating the
    SCANTYPE2TABLE table.
}
```

Next, the stopDiscovery method example pseudocode describes the processing that occurs when the set of database updates following the completion of a probe have completed.

```
int stopDiscovery(String scanId, int systemType, int systemId) {
    For each DB table T updated during the scan {
        If this scanner is authoritative for the element corr. to table T
        {
            If there are also nonauthoritative sources for T {
                Delete all elements of ELEMENT_PROBE_STATUS where
                ELEMENT_TYPE corresponds to table T, and the element belongs
                to the system scanned
                    WHERE T.UPDATE_TIMESTAMP < START_TS of this scan;
                /* This includes records of each element of T belonging to
                   the scanned system which were reported by other scanners.
                   These will be deleted or marked undetectable in table T,
                   so delete them from the auxiliary table, overriding the
                   information in the auxiliary table because this is an
                   authoritative scanner. */
            }
            If table T has the DETECTABLE field {
                For all elements of T belonging to system scanned
                    WHERE UPDATE_TIMESTAMP < START_TS of discovery/probe
                    Set DETECTABLE = 0
            }
            else { /* SIM not interested in displaying "missing" status */
                Delete all elements of T belonging to system scanned
                    WHERE UPDATE_TIMESTAMP < START_TS of this scan;
            }
        } /* if this scanner is an authoritative source for this table */
        else {
            /* Table updated by nonauth source(s) only. Execute
               consensus logic. */
            Update all elements of table ELEMENT_PROBE_STATUS
                WHERE ELEMENT_TYPE corresponds to table T, SCAN_ID matches
                scanId passed to the stopProbe() method, and
                UPDATE_TIMESTAMP < START_TS of this scan
                Set found = 0 in each such tuple
                /* This identifies all elements of T not found on this
                   scan by this scanner. */
                set S = {all elements in table ELEMENT_PROBE_STATUS
                    WHERE ELEMENT_TYPE corresponds to table T and
                    MAX(found)=0
                    as reported by various scanners}
                /* This query identifies each element of T that was found
                   in at least one earlier scan of this system, but is
                   currently not detectable by *any* scanner. */
                if table T has the DETECTABLE field {
                    Update all elements in table T that are in set S
                        set T.DETECTABLE = 0
                }
                else {
                    Delete all elements of table T which are in set S;
                }
```

-continued

```
        delete elements from ELEMENT_PROBE_STATUS which represent the
        elements in set S, as reported by various scanners.
     } /* this scanner not an authoritative source for this table.
  } /* For each DB table updated during scan */
} /* stopDiscovery */
```

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:

program instructions for gathering information of one or more storage area network (SAN) components in a discovery process from one or more sources for a storage infrastructure manager (SIM);

program instructions for storing the information in a database; and program instructions for analyzing the information from the discovery process to infer which of the one or more SAN components are currently detectable to the SIM, where each of the one or more sources of the information are each classified as either only an authoritative source or only a nonauthoritative source and the information from any authoritative source is prioritized over the information from any nonauthoritative source and the nonauthoritative sources can define one of the one or more SAN components in the discovery process as missing only if all of the nonauthoritative sources report the one as missing in their most recent scan and any authoritative source can define the one as missing;

wherein the SIM accepts a report from an authoritative source that a SAN component is missing without waiting for reports from additional sources.

2. The computer program of claim 1, wherein analyzing the information from the discovery process is performed by a detectability service of the SIM.

3. The computer program of claim 1, wherein prioritizing the information from any authoritative source over the information from any nonauthoritative source includes consensus determining such that a missing SAN component is only identified when all the one or more sources of the information are nonauthoritative and all the one or more sources of the information report the missing SAN component.

4. The computer program of claim 1, wherein the SIM comprises a discovery engine including:

one or more scanners for probing for the one or more storage area network (SAN) components in the discovery process and receiving the information;

one or more parsers for parsing the information received from the one or more scanners;

and one or more processors for communicating the parsed information through one or more database mappers to store the parsed information in the database.

5. The computer program of claim 4, wherein the information reported by each of the one or more scanners is either only authoritative or only nonauthoritative.

6. The computer program of claim 4, wherein each of the one or more scanners are selected from the group consisting of an in-band scanner and an out-of-band scanner.

7. The computer program of claim 1, wherein the SIM comprises one or more database mappers for updating the database with the information from the one or more SAN components.

8. The computer program of claim 1, wherein one or more management agents manage the one or more SAN components communicating the information of the one or more SAN components to the SIM.

9. The computer program of claim 1, wherein the information of the one or more SAN components is dynamically determined and persisted in the database.

10. The computer program of claim 1, wherein the information reported during a scan is used to populate one or more metadata tables in a database to assist the detectability process.

11. A method comprising the steps of:

gathering information of one or more storage area network (SAN) components in a discovery process from one or more sources for a storage infrastructure manager (SIM); storing the information in a database; and analyzing the information from the discovery process to infer which of the one or more SAN components are currently detectable to the SIM, where each of the one or more sources of the information are each classified as either only an authoritative source or only a nonauthoritative source and the information from any authoritative source is prioritized over the information from any nonauthoritative source and the nonauthoritative sources can define one of the one or more SAN components in the discovery process as missing only if all of the nonauthoritative sources report the one as missing in their most recent scan and any authoritative source can define the one as missing;

wherein the SIM accepts a report from an authoritative source that a SAN component is missing without waiting for reports from additional sources.

12. The method of claim 11, wherein analyzing the information from the discovery process is performed by a detectability service of the SIM.

13. The method of claim 11, wherein prioritizing the information from any authoritative source over the information from any nonauthoritative source includes consensus determining such that a missing SAN component is only identified when all the one or more sources of the information are nonauthoritative and all the one or more sources of the information report the missing SAN component.

14. The method of claim 11, wherein the SIM comprises a discovery engine performing the steps of:

probing for the one or more storage area network (SAN) components in the discovery process with one or more scanners and receiving the information;

parsing the information received from the one or more scanners with one or more parsers; and communicating the parsed information through one or more database mappers with one or more processors to store the parsed information in the database.

15. The method of claim 14, wherein the information reported by each of the one or more scanners is either only authoritative or only nonauthoritative.

16. The method of claim 14, wherein each of the one of the one or more scanners are selected from the group consisting of an in-band scanner and an out-of-band scanner.

17. The method of claim 11, wherein the SIM comprises one or more database mappers for updating the database with the information from the one or more SAN components.

18. The method of claim 11, wherein one or more management agents manage the one or more SAN components communicating the information of the one or more SAN components to the SIM.

19. The method of claim 11, wherein the information of the one or more SAN components is dynamically determined and persisted in the database.

20. The method of claim 11, wherein the information reported during a scan is used to populate one or more metadata tables in a database to assist the detectability process.

* * * * *